No. 800,052. PATENTED SEPT. 19, 1905.
H. C. AYRES.
CONDUIT FOR ELECTRIC WIRING.
APPLICATION FILED MAR. 13, 1905.
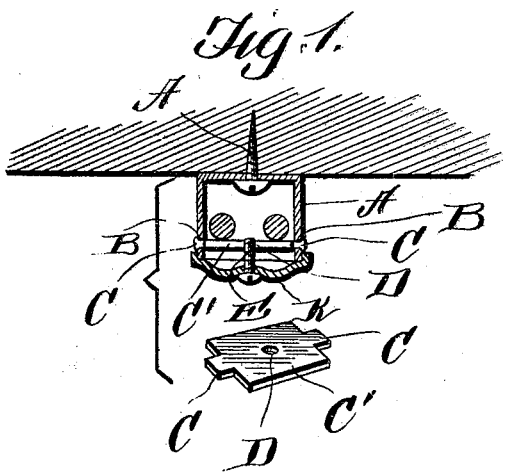
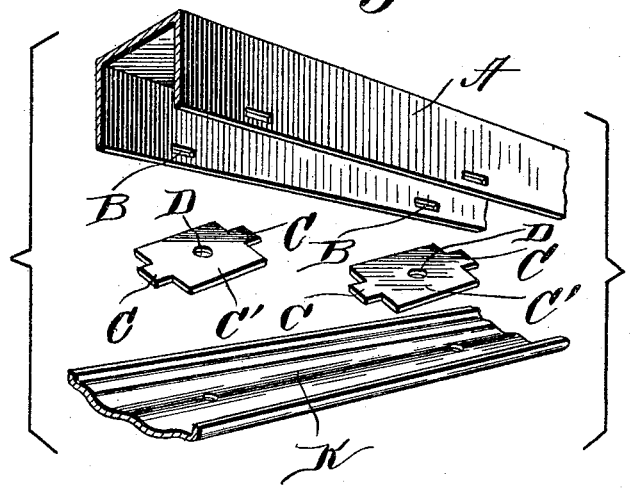
Witnesses
R. A. Boswell.
Clara S. Davenport
Inventor
Henry C. Ayres.
By Franklin H. Hough
Attorney

UNITED STATES PATENT OFFICE.

HENRY C. AYRES, OF GREENVILLE, OHIO, ASSIGNOR TO THE ADJUSTABLE FIXTURE AND MANUFACTURING COMPANY, OF GREENVILLE, OHIO.

CONDUIT FOR ELECTRIC WIRING.

No. 800,052.     Specification of Letters Patent.     Patented Sept. 19, 1905.

Application filed March 13, 1905. Serial No. 249,905.

*To all whom it may concern:*

Be it known that I, HENRY C. AYRES, a citizen of the United States, residing at Greenville, in the county of Darke and State of Ohio, have invented certain new and useful Improvements in Conduits for Electrical Wiring; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in conduits for electric wiring; and it consists, essentially, in the provision of a metallic trough-shaped member which is adapted to be fastened to the ceiling or wall of a room and provided with a series of cross-pieces, which are permanently held in the opposite walls of the conduit and adapted to retain conductor-wires within the conduit, and in the provision of a cover which is fastened to said cross-pieces.

The invention consists, further, in various details of construction and arrangements of parts, which will be hereinafter fully described and then specifically defined in the appended claim.

My invention is illustrated in the accompanying drawings, which, with the letters of reference marked thereon, form a part of this application, and in which drawings—

Figure 1 is a cross-sectional view through my improved conduit, and Fig. 2 is a perspective view showing the manner in which the parts are held together.

Reference now being had to the details of the drawings by letter, A designates a trough-shaped receptacle, of metal, which is held, by means of screws A' or other suitable fastening means, to the ceiling or wall of a room, and at intervals along the marginal edges of the parallel portions of the conduit are formed apertures B, in which the contracted ends C of the cross-pieces C' are adapted to be passed, and after being inserted in place the contracted ends of said cross-pieces are battered, thereby securely held in place. Each of said cross-pieces is provided with a central aperture D, through which a bolt E or other fastening device passes, and which bolt also passes through a cover K, which is adapted to rest upon the free longitudinal edges of the conduit. It will be observed that a slight space intervenes between the free longitudinal edges of the conduit and the cross-pieces C' sufficient to allow for connections between the ends of conducting-wires, if found desirable.

From the foregoing it will be observed that by the mechanism shown and described a simple and efficient means is afforded for securely holding electric wiring within the conduit and at a slight distance from the cover, and when the latter is adjusted in place an ornamental effect will be produced, the entire weight of the wiring being supported by the cross-pieces independent of the cover.

While I have shown a particular form of device illustrating my conduit, it will be understood that I may vary the form or shape of the parts, if desired, without in any way departing from the spirit of the invention.

Having thus fully described my invention, what I claim as new, and desire to secure by Letters Patent, is—

A conduit for electric wiring, comprising an angular metallic casing, with apertures, oppositely disposed, adjacent to the longitudinal edges in the sides of said casing, rectangular-outlined cross-pieces having contracted projecting portions, forming angles with the ends of said cross-pieces, said projecting portions being adapted to engage said apertures, and the ends of the cross-pieces to bear against the inner faces of said casing, a closure, having its opposite longitudinal edges each bent at an angle and designed to fit over the longitudinal edges of said casing, and screws passing through said closure and engaging the threaded apertures in said cross-pieces, as shown and described.

In testimony whereof I hereunto affix my signature in presence of two witnesses.

HENRY C. AYRES.

Witnesses:
    A. L. HOUGH,
    FRANKLIN H. HOUGH.